US012727045B2

(12) United States Patent
Khalid et al.

(10) Patent No.: US 12,727,045 B2
(45) Date of Patent: Sep. 1, 2026

(54) PROACTIVE DSDS HANDOFF UNDER GRANT SUSPENSION FOR WIRELESS NETWORKS

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 294 days.

(21) Appl. No.: 18/593,358

(22) Filed: Mar. 1, 2024

(65) Prior Publication Data

US 2025/0280462 A1 Sep. 4, 2025

(51) Int. Cl.
*H04W 76/16* (2018.01)
*H04W 8/18* (2009.01)
*H04W 88/06* (2009.01)

(52) U.S. Cl.
CPC .......... *H04W 76/16* (2018.02); *H04W 8/183* (2013.01); *H04W 88/06* (2013.01)

(58) Field of Classification Search
None
See application file for complete search history.

(56) References Cited

U.S. PATENT DOCUMENTS

2009/0022103 A1* 1/2009 Shatsky .......... H04W 36/00224 370/331
2022/0286994 A1* 9/2022 Singh .................... H04W 24/04
2022/0369085 A1* 11/2022 Kumar .................. G01C 21/26

* cited by examiner

*Primary Examiner* — Abdelillah Elmejjarmi
(74) *Attorney, Agent, or Firm* — Mendelsohn Dunleavy, P.C.; Steve Mendelsohn

(57) ABSTRACT

When a first (e.g., CBRS) network receives instructions to modify its operations with a dual-SIM, dual-subscription (DSDS) device, e.g., due to the local incumbent activity, instead of modifying CBRS operations for the DSDS device, the DSDS device is proactively handed off to a second (e.g., non-CBRS) network, thereby avoiding a reduction of quality of service to the DSDS device. If and when the local incumbent activity ceases, the original CBRS operations can be automatically restored by handing off from the non-CBRS network back to the CBRS network. In some implementations, these functions are orchestrated by a DSDS Mobile Transfer Entity of the CBRS network.

18 Claims, 6 Drawing Sheets

230 SAS

210 CBRS CORE

212 OSS

214 DMTE

302 CBSD 304 gNodeB

240 DSDS

444 MERGE DATA SESSIONS

PROACTIVE DSDS HANDOFF UNDER GRANT SUSPENSION FOR WIRELESS NETWORKS

BACKGROUND

Field of the Disclosure

The present disclosure relates to communication networks and, more specifically but not exclusively, to CBRS communication networks.

Description of the Related Art

This section introduces aspects that may help facilitate a better understanding of the disclosure. Accordingly, the statements of this section are to be read in this light and are not to be understood as admissions about what is prior art or what is not prior art.

A dual-SIM, dual-subscription (DSDS) wireless device is able to communicate with two different wireless networks at the same time. A DSDS device has a connection manager that controls the handing off of connections between the two wireless networks.

In a Citizens Broadband Radio Service (CBRS) network, incumbent (i.e., government) users have priority of non-incumbent users, such as commercial wireless network providers. When an active incumbent user is present, the Spectrum Access System (SAS) for the CBRS network will instruct non-incumbents to modify their use of the CBRS spectrum to avoid interfering with the incumbent. Modification may involve a network provider's base stations (i.e., CBSDs) temporarily (i) moving existing communications with its customers' wireless user equipments (UEs) from one CBRS sub-band to another CBRS sub-band, (ii) significantly reducing transmit power levels, and/or (iii) suspending operations altogether. If and when the incumbent's local use of the CBRS spectrum terminates, the SAS may instruct the non-incumbents to resume their previous use of the CBRS spectrum. These temporary modifications may result in decreased capability of the non-incumbents to support their customers in a satisfactory manner.

SUMMARY

Problems in the prior art are addressed in accordance with the principles of the present disclosure by pre-emptively and automatically handing off DSDS communications from a CBRS network to a different wireless network when the CBRS network's SAS instructs the CBRS network to modify its communications due to the presence of a locally active incumbent. If and when the incumbent is no longer locally active, the original DSDS communications with the CBRS network can be automatically resumed.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
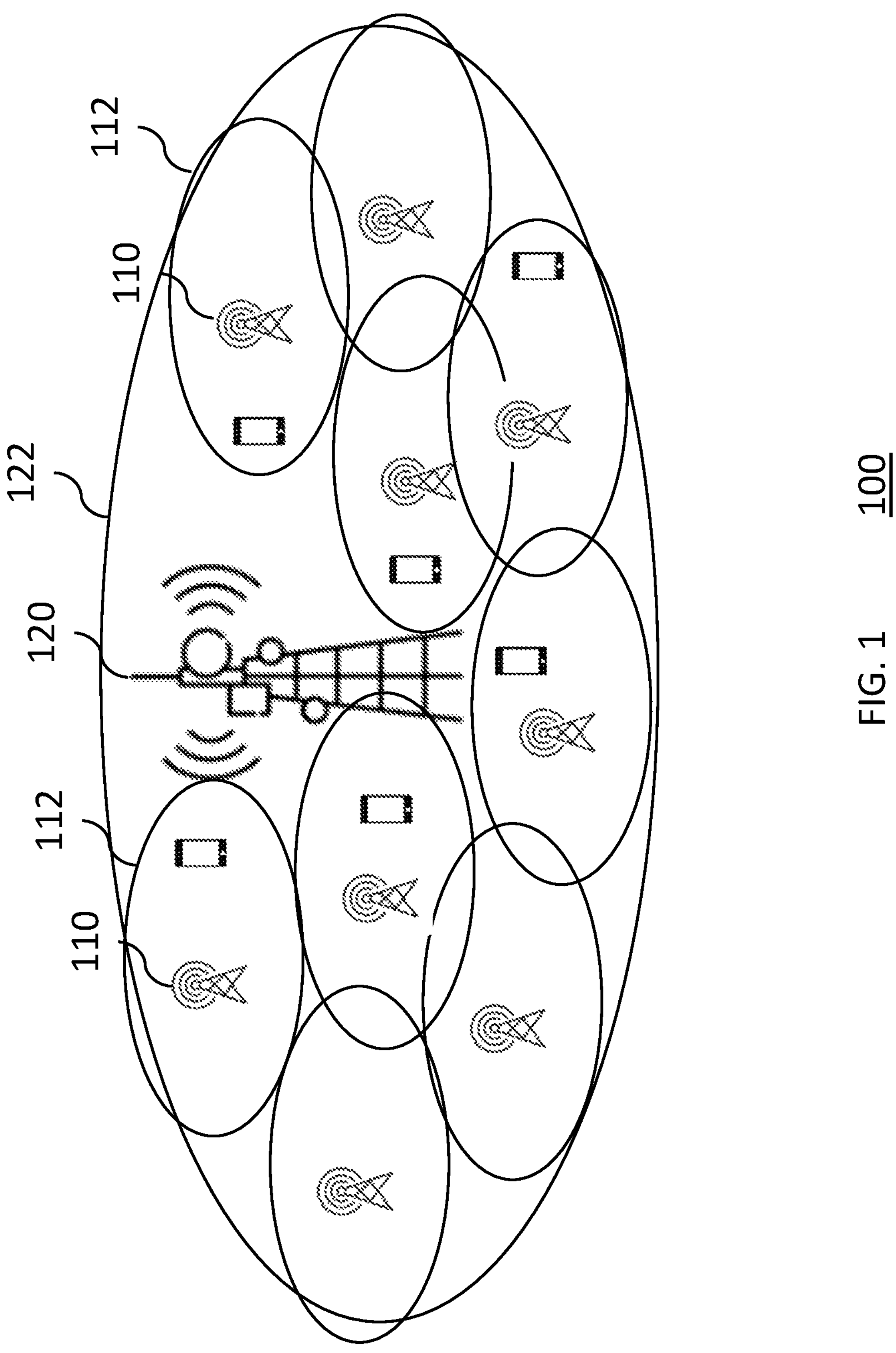
FIG. 1 is a simplified diagram representing an example configuration in which two different networks—a CBRS network and a non-CBRS network—operate in the same geographic region and have at least some overlapping coverage areas.

FIG. 1 is a simplified diagram representing an example configuration 100 in which two different networks—a CBRS network and a non-CBRS network—operate in the same geographic region and have at least some overlapping coverage areas. As shown in FIG. 1, towers 110 represent the CBSDs of the CBRS network, where each CBSD has a corresponding coverage area 112, while tower 120 represents the base station of the non-CBRS network having a corresponding, relatively large coverage area 122 that covers a number of the CBSD coverage areas 112.

Figure 2:
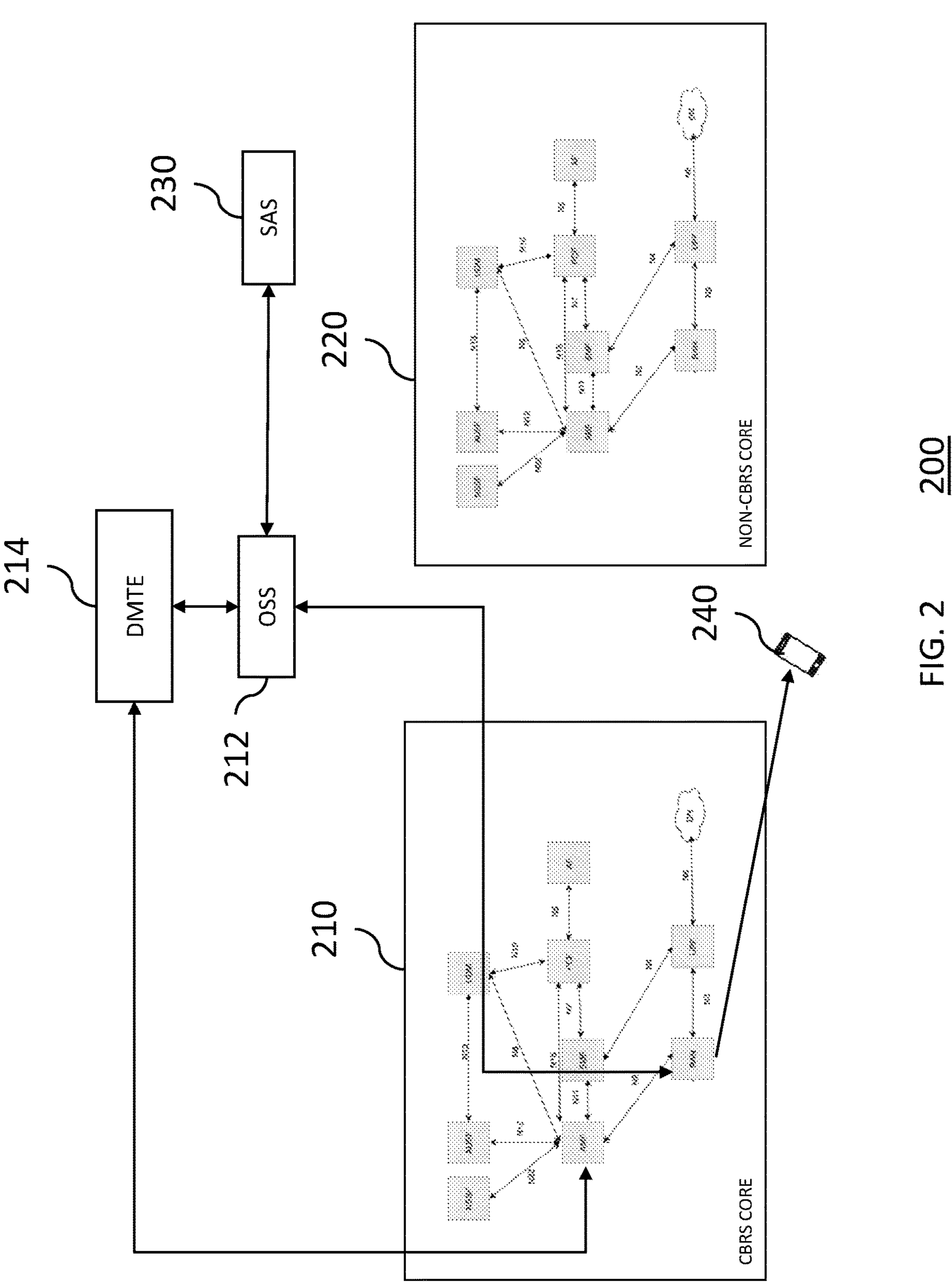
FIG. 2 is a block diagram of some of the infrastructure supporting the configuration of FIG. 1.

FIG. 2 is a block diagram of some of the infrastructure 200 supporting the configuration 100 of FIG. 1. In particular, FIG. 2 shows the core networks 210 and 220 for the CBRS and non-CBRS networks, respectively, of FIG. 1. In addition, FIG. 2 shows (i) the Operation and Support System (OSS) 212 of the CBRS network which communicates with the CBSD network's SAS 230 and (ii) a DSDS Mobile Transfer Entity (DMTE) 214, which supports the pre-emptive handoff function of the present disclosure. Depending on the particular implementation, the DMTE 214 may be implemented as part of or separate from the OSS 212, including possibly in the cloud. FIG. 2 also shows a DSDS device 240 communicating with the CBRS core network 210 via one of the CBRS network's CBSDs (not explicitly shown in FIG. 2).

According to conventional CBRS network operations, when the SAS 230 detects the presence of an incumbent (not shown in FIG. 2), the SAS 230 instructs the OSS 212 to modify the operations of the CBRS network. The SAS 230 typically gives the CBRS network a specified amount of time (e.g., 60 seconds) to modify its operations to avoid interfering with the incumbent.

According to certain embodiments of the present disclosure, the OSS 212 shares the SAS instructions with the DMTE 214, which orchestrates a handoff of the communications between the DSDS device 240 and the CBRS network to the non-CBRS network, such that the communications between the DSDS device 240 and the non-CBRS network will instead be handled by the non-CBRS core network 220. If and when the incumbent's local activity ceases and the SAS 230 instructs the OSS 212 to resume the CBRS network's previous use of the CBRS spectrum, the DMTE 214 can orchestrate a handoff of the communications between the DSDS device 240 and the non-CBRS network back to the CBRS network, such that the communications between the DSDS device 240 and the CBRS network will once again be handled by the CBRS core network 210, as shown in FIG. 2.

Figure 3:
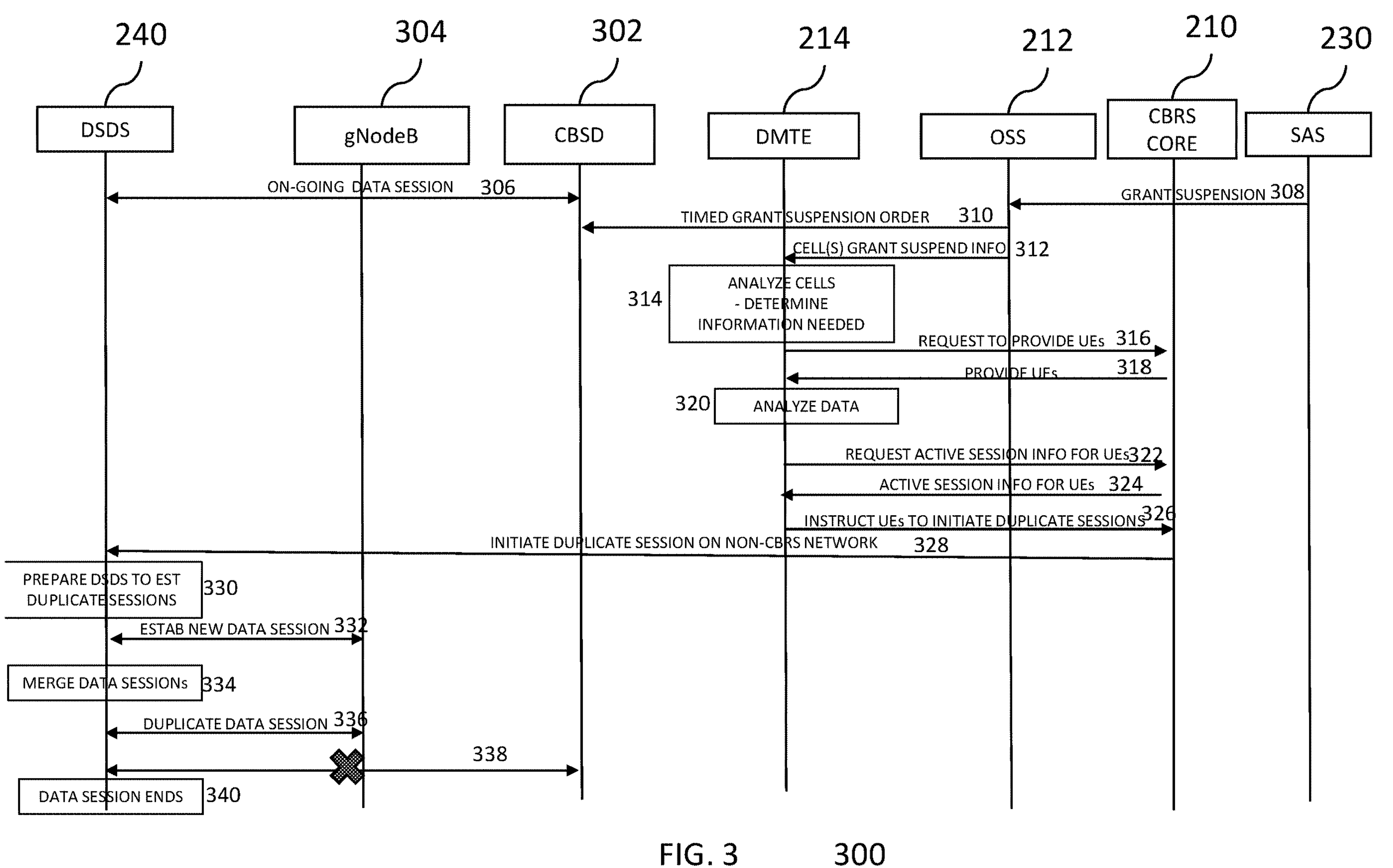
FIG. 3 is a message flow diagram of an example sequence of messages for the handoff of communications of the DSDS device of FIG. 2 from the CBRS network to the non-CBRS network.

FIG. 3 is a message flow diagram of an example sequence 300 of messages for the handoff of communications of the DSDS device 240 of FIG. 2 from the CBRS network to the non-CBRS network. As shown in FIG. 3, the sequence 300 begins at step 306 with the DSDS device 240 having an on-going data session with a CBSD 302 of the CBRS network.

In step 308, after detecting local incumbent activity, the SAS 230 transmits a grant suspension message to the CBRS network's OSS 212 of FIG. 2 identifying which of the CBRS network's CBSDs (including, in this example, the CBSD 302) need to modify their operations within a specified period of time (e.g., 60 seconds). In response, in step 310, the OSS 212 forwards the grant suspension message to the CBSD 302 (and any other affected CBSDs) instructing the CBSD 302 to modify its operations as dictated by the SAS 230, but to wait until after a specified period of time (e.g., slightly less than 60 seconds) has passed (to give time for any proactive handoffs to occur).

In addition, in step 312, the OSS 212 shares the grant suspension message with the DMTE 214. In response, in step 314, the DMTE 214 analyzes the coverage areas (i.e., cells) that are affected by the grant suspension message (including, in this example, the cell associated with the CBSD 302) to determine information needed to hand off certain communications (if any) to the non-CBSD network. This information includes an identification of the cells impacted by the grant suspension and whether the grant suspension affects all of the cells or only some of them.

In step 316, the DMTE 214 transmits a request to the CBRS core 210 for the identities of any DSDS devices currently located within the cells affected by the grant suspension, and, in step 318, the CBRS core 210 responds with the identities of those DSDS device (including, in this example, the DSDS device 240). In some implementations, for each DSDS device, the information transmitted in step 318 includes one or more of:

The International Mobile Subscriber Identity (IMSI) stored in the device's Subscriber Identify Module (SIM) associated with the CBRS network;

The Global Unique Temporary Identifier (GUTI), a core network temporary identifier used for access security context; and The Cell Radio Network Temporary Identifier (C-RNTI) that identifies the device's Radio Resource Control (RRC).

In step 320, the DMTE 214 analyzes the data received from the CBRS core 210 in step 318 to determine which of those DSDS devices identified in step 318 have currently active communication sessions (including, in this example, the DSDS device 240) and which of those identified DSDS devices are currently inactive.

In step 322, the DMTE 214 transmits a request to the CBRS core 210 for information about those DSDS devices having active communication sessions (including, in this example, the DSDS device 240), and, in step 324, the CBRS core 210 responds with the requested information. In some implementations, for each active session of a DSDS device, the information transmitted in step 324 includes one or more of:

The Packet Data Unit (PCU) session identifier;

The Evolved Packet System (EPS) bearer;

The Quality of Service (QOS) Flow Identifier (QFI); and

The Tunnel End Point Identifier (TEID).

In step 326, the DMTE 214 instructs the CBRS core 210 to initiate handoff procedures for specific DSDS devices at specific CBSDs (including, in this example, the DSDS device 240 at CBSD 302). In response, in step 328, the CBRS core 210 transmits a message to the DSDS device 240 via the CBSD 302 instructing the DSDS device 240 to initiate a communication session between the DSDS device 240 and the non-CBRS network.

In step 330, the DSDS device 240 (actually the connection manager (not shown) of the DSDS device 240) prepares the DSDS device 240 to initiate a duplicate session with the non-CBRS network. As understood by those skilled in the art, in this context, a duplicate session is a redundant communication session (i.e., having the same data) between the DSDS device 240 and the non-CBRS network that occurs in parallel with the already existing communication session between the DSDS device 240 and the CBRS network of step 306.

To that end, in step 332, the DSDS device 240 communicates with a base station of the non-CBRS network (in this example, gNodeB 304) to initiate a new data session. In step 334, the DSDS device 240 merges the new non-CBRS data session with the existing CBRS data session, such that, in step 336, the duplicate session with the non-CBRS network is established.

In step 338, having established the duplicate session with the non-CBRS network's gNodeB 304, the DSDS device 240 stops transmitting data to the CBRS network's CBSD 302 such that, in step 340, the communication session with the CBRS network is terminated. In some possible implementations, the connection manager of the DSDS device 240 automatically terminates the session with the CBRS network after recognizing that existence of the two duplicate sessions. In other possible implementations, the DSDS device 240 transmits a message to the CBRS network confirming the establishment of the duplicate session with the non-CBRS network and the CBRS network responds by instructing the DSDS device 240 to terminate the session with the CBRS network.

Note that the establishment of the duplicate session with the non-CBRS network and the termination of the original session with the CBRS network in FIG. 3 all occur within the duration (e.g., 60 seconds) specified by the SAS 230 in step 308 for modifying the communications of the CBRS network. In this way, the DMTE 214 pre-empts the conventional modification of CBRS network operations for impacted DSDS devices by proactively handing off those communications to the non-CBRS network, thereby avoiding at least some of the conventional decrease in capability of the CBRS network due to incumbent activity and provide at least those DSDS customers with high-quality service.

As described previously, if not terminated for other, conventional reasons, the new communication session between the DSDS device 240 and the non-CBRS network may continue as long as the incumbent's local activity continues.

Figure 4:
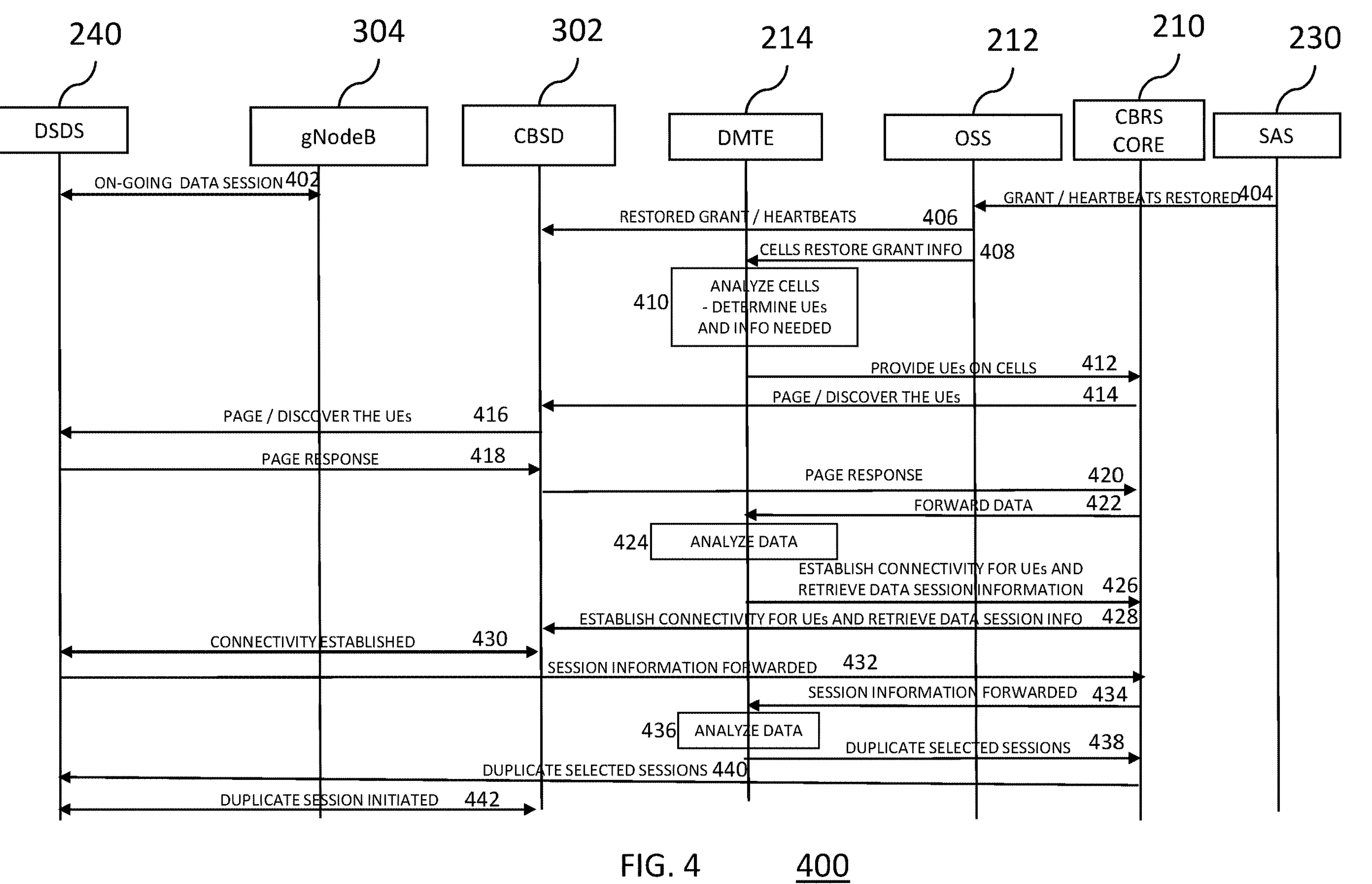
FIG. 4 is a message flow diagram of an example sequence of messages that may occur for the handoff of communications of the DSDS device of FIG. 2 from the non-CBRS network back to the CBRS network after the incumbent's local activity has ceased.

FIG. 4 is a message flow diagram of an example sequence 400 of messages that may occur for the handoff of communications of the DSDS device 240 of FIG. 2 from the non-CBRS network back to the CBRS network after the incumbent's local activity has ceased. As shown in FIG. 4, the sequence 400 begins at step 402 with the DSDS device 240 having the same on-going data session with the gNodeB 304 of the non-CBRS network that was established by the sequence 300 of FIG. 3.

In step 404, after determining that the incumbent's local activity has ceased, the SAS 230 transmits a grant restoration message (and associated heartbeats) to the CBRS network's OSS 212 identifying which of the CBRS network's CBSDs (including, in this example, the CBSD 302) need to modify their operations within a specified period of time (e.g., 60 seconds). In response, in step 406, the OSS 212 forwards the grant restoration message to the CBSD 302 instructing the CBSD 302 to modify its operations after a specified period of time (e.g., slightly less than 60 seconds).

In addition, in step 408, the OSS 212 shares the grant restoration message with the DMTE 214. In response, in step 410, the DMTE 214 analyzes the cells that are affected by the grant restoration message (including, in this example, the cell associated with the CBSD 302) to determine information needed to hand off communications (if any) from the non-CBSD network back to the CBSD network. This information includes an identification of the cells having a restored heartbeat, an identification of the DSDS devices that were present in the CBSD network before the grant suspension was imposed, and a determination of the projected load associated with the restoration of service to those DSDS devices.

In step 412, the DMTE 214 transmits a request to the CBRS core 210 for the identities of any DSDS devices currently located within the cells affected by the grant restoration, and, in step 414, the CBRS core 210 forwards the request of step 412 to the CBSD 302. In step 416, the CBSD 302 transmits a page message to determine which UEs are currently located within its cell. In step 418, the DSDS device 240 transmits a page response to the CBSD 302, which, in step 420, the CBSD 302 forwards to the CBRS core 210.

In step 422, in response to the page response of step 420 and the request of step 412, the CBRS core 210 provides information about the UEs (including, in this example, the DSDS device 240) to the DMTE 214. In some implementations, step 422 involves the same types of information as for step 318 of FIG. 3.

In step 424, the DMTE 214 analyzes the data received from the CBRS core 210 in step 422 to identify those identified DSDS devices that have currently active communication sessions with the CBRS network and those identified DSDS devices that do not (including, in this example, the DSDS device 240).

In step 426, the DMTE 214 instructs the CBRS core 210 to establish a connection with specific DSDS devices at specific CBSDs (including, in this example, the DSDS device 240 at CBSD 302) and retrieve information about those DSDS devices having active communication sessions (including, in this example, the DSDS device 240). In step 428, the CBRS core 210 forwards those instructions to the CBSD 302, which, in step 430, establishes the connection with the DSDS device 240 and requests the session information.

In step 432, the DSDS device 240 transmits the session information to the CBRS core 210 via the CBSD 302, which, in step 434, the CBRS core 210 forwards to the DMTE 214. In some implementations, steps 432 and 434 involve the same types of information as for step 324 of FIG. 3.

In step 436, the DMTE 214 analyzes the data received from the CBRS core 210 and selects duplicate sessions to be initiated (including, in this example, a duplicate session between the DSDS device 240 and the CBSD 302. In step 438, the DMTE 214 instructs the CBRS core 210 about those duplicate sessions to be initiated, and, in step 440, the CBRS core 210 instructs the DSDS device 240 via the CBSD 302 to establish a communication session with the CBSD 302 that is a duplicate of the existing session with the gNodeB 304.

In step 442, the DSDS device 240 establishes that duplicate session with the CBSD 302, and, in step 444, merges that duplicate session with the existing session with the gNodeB 304. In step 446, the DSDS device 240 ceases to transmit data thereby terminating the existing session with the gNodeB 304, while maintaining the newly restored session with the CBSD 302. As before, in some possible implementations, the connection manager of the DSDS device 240 automatically terminates the session with the non-CBRS network after recognizing that existence of the two duplicate sessions. In other possible implementations, the DSDS device 240 transmits a message to the CBRS network confirming the establishment of the duplicate session with the non-CBRS network, and the CBRS network responds by instructing the DSDS device 240 to terminate the session with the non-CBRS network.

Here, too, the establishment of the duplicate session with the CBRS network and the termination of the session with the non-CBRS network all occur within the duration (e.g., 60 seconds) specified by the SAS 230 for modifying the communications of the CBRS network. In this way, the DMTE 214 pre-empts the conventional modification of CBRS network operations for DSDS devices by proactively handing off those communications back to the CBRS network, thereby restoring CBRS network operations to what they were before the incumbent's local activity occurred.

Although the present disclosure has been described in the context of the configuration 100 of FIG. 1 having a CBRS network and a non-CBRS network, those skilled in the art will understand that certain embodiments of the disclosure can be implemented in the context of two non-CBRS networks.

Figure 5:
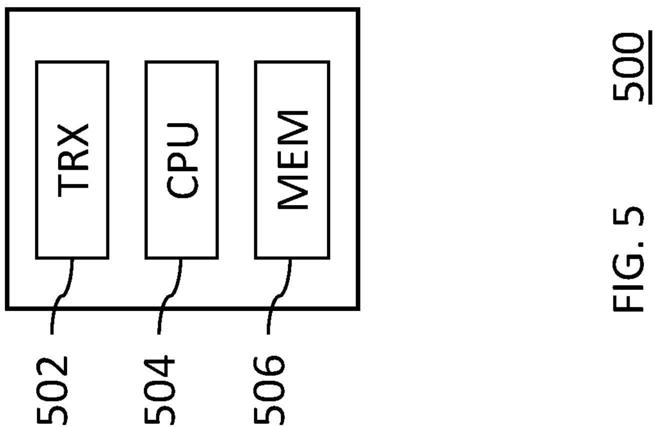
FIG. 5 is a simplified hardware block diagram of an example node that can be used to implement any of the nodes of FIGS. 1-4.

FIG. 5 is a simplified hardware block diagram of an example node 500 that can be used to implement any of the nodes of FIGS. 1-4. As shown in FIG. 5, the node 500 includes (i) communication hardware (e.g., wireless, wireline, and/or optical transceivers (TRX)) 502 that supports communications with other nodes, (ii) a processor (e.g., CPU microprocessor) 504 that controls the operations of the node 500, and (iii) a memory (e.g., RAM, ROM) 506 that stores code executed by the processor 504 and/or data generated and/or received by the node 500.

In certain embodiments, the present disclosure is a DMTE comprising a memory and at least one processor, coupled to the memory and operative to receive information that original operations of a first base station of a first wireless network are to be modified; determine that a DSDS device has a first active session with the first base station; and generate instructions for the DSDS device to establish a second active session with a second base station of a second wireless network in order to hand off the first active session with the first wireless network to the second active session with the second wireless network, wherein the second active session is related to the first active session.

In at least some of the above embodiments, (i) the information is received from the first wireless network; (ii) the determining comprises the DMTE transmitting a request to the first wireless network for identification of any DSDS devices connected to the first base station; receiving identification of the DSDS device; transmitting a request to the first wireless network for identification of any active sessions between the DSDS device and the first base station; and receiving identification of the first active session; and (iii) the instructions are transmitted to the first wireless network.

In at least some of the above embodiments, the first wireless network is a Citizens Broadband Radio Service (CBRS) network and the second wireless network is a non-CBRS network.

In at least some of the above embodiments, the DMTE is further adapted to receive information that the original operations of the first base station are to be restored; determine that the DSDS device has the second active session with the second base station; and generate instructions for the DSDS device to establish a third active session with the first base station in order to hand off the second active session with the second wireless network to the third active session with the first wireless network, wherein the third active session is related to the second active session.

In certain embodiments, the present disclosure is a DSDS device comprising a memory and at least one processor, coupled to the memory and operative to establish a first active session with a first base station of a first wireless network; receive instructions to establish a second active session with a second base station of a second wireless network in order to hand off the first active session with the first wireless network to the second active session with the second wireless network, wherein the second active session is related to the first active session; establish the second active session; and terminate the first active session after establishing the second active session.

In at least some of the above embodiments, the DSDS device is adapted to automatically terminate the first active session.

In at least some of the above embodiments, before terminating the first active session, the DSDS device is adapted to inform the first wireless network of the establishment of the second active session and receive an instruction from the first wireless network to terminate the first active session.

In at least some of the above embodiments, the first wireless network is a CBRS network and the second wireless network is a non-CBRS network.

In at least some of the above embodiments, the DSDS device is further adapted to receive instructions to establish a third active session with the first base station in order to hand off the second active session with the second wireless network to the third active session with the first wireless network, wherein the third active session is related to the second active session; establish the third active session; and automatically terminate the second active session.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method comprising a dual-SIM, dual-subscription (DSDS) mobile transfer entity (DMTE):

receiving information that original operations of a first base station of a first wireless network are to be modified;

determining that a DSDS device has a first active session with the first base station; and generating instructions for the DSDS device to establish a second active session with a second base station of a second wireless network in order to hand off the first active session with the first wireless network to the second active session with the second wireless network, wherein the second active session is related to the first active session, wherein:

the information is received from the first wireless network;

the determining comprises:

transmitting a request to the first wireless network for identification of any DSDS devices connected to the first base station;

receiving identification of the DSDS device;

transmitting a request to the first wireless network for identification of any active sessions between the DSDS device and the first base station; and receiving identification of the first active session; and the instructions are transmitted to the first wireless network.

2. The method of claim 1, wherein:

the first wireless network is a Citizens Broadband Radio Service (CBRS) network; and the second wireless network is a non-CBRS network.

3. The method of claim 1, further comprising the DMTE:

receiving information that the original operations of the first base station are to be restored;

determining that the DSDS device has the second active session with the second base station; and generating instructions for the DSDS device to establish a third active session with the first base station in order to hand off the second active session with the second wireless network to the third active session with the first wireless network, wherein the third active session is related to the second active session.

4. A dual-SIM, dual-subscription (DSDS) mobile transfer entity (DMTE) comprising:

a memory; and at least one processor, coupled to the memory and operative to:

receive information that original operations of a first base station of a first wireless network are to be modified;

determine that a DSDS device has a first active session with the first base station; and generate instructions for the DSDS device to establish a second active session with a second base station of a second wireless network in order to hand off the first active session with the first wireless network to the second active session with the second wireless network, wherein the second active session is related to the first active session, wherein:

the information is received from the first wireless network;

the determining comprises the DMTE:

transmitting a request to the first wireless network for identification of any DSDS devices connected to the first base station;

receiving identification of the DSDS device;

transmitting a request to the first wireless network for identification of any active sessions between the DSDS device and the first base station; and receiving identification of the first active session; and the instructions are transmitted to the first wireless network.

5. The DMTE of claim 4, wherein:

the first wireless network is a Citizens Broadband Radio Service (CBRS) network; and the second wireless network is a non-CBRS network.

6. The DMTE of claim 4, wherein the DMTE is further adapted to:

receive information that the original operations of the first base station are to be restored;

determine that the DSDS device has the second active session with the second base station; and generate instructions for the DSDS device to establish a third active session with the first base station in order to hand off the second active session with the second wireless network to the third active session with the first wireless network, wherein the third active session is related to the second active session.

7. A method comprising a dual-SIM, dual-subscription (DSDS) device:

establishing a first active session with a first base station of a first wireless network;

receiving instructions to establish a second active session with a second base station of a second wireless network in order to hand off the first active session with the first wireless network to the second active session with the second wireless network, wherein the second active session is related to the first active session;

establishing the second active session;

terminating the first active session after establishing the second active session;

receiving instructions to establish a third active session with the first base station in order to hand off the second active session with the second wireless network to the third active session with the first wireless network, wherein the third active session is related to the second active session;

establishing the third active session; and automatically terminating the second active session.

8. The method of claim 7, wherein the DSDS device automatically terminates the first active session.

9. The method of claim 7, wherein, before terminating the first active session, the DSDS device informs the first wireless network of the establishment of the second active session and receives an instruction from the first wireless network to terminate the first active session.

10. The method of claim 7, wherein:

the first wireless network is a Citizens Broadband Radio Service (CBRS) network; and the second wireless network is a non-CBRS network.

11. A dual-SIM, dual-subscription (DSDS) device comprising:

a memory; and at least one processor, coupled to the memory and operative to:

establish a first active session with a first base station of a first wireless network;

receive instructions to establish a second active session with a second base station of a second wireless network in order to hand off the first active session with the first wireless network to the second active session with the second wireless network, wherein the second active session is related to the first active session;

establish the second active session;

terminate the first active session after establishing the second active session;

receive instructions to establish a third active session with the first base station in order to hand off the second active session with the second wireless network to the third active session with the first wireless network, wherein the third active session is related to the second active session;

establish the third active session; and automatically terminate the second active session.

12. The DSDS device of claim 11, wherein the DSDS device is adapted to automatically terminate the first active session.

13. The DSDS device of claim 11, wherein, before terminating the first active session, the DSDS device is adapted to inform the first wireless network of the establishment of the second active session and receive an instruction from the first wireless network to terminate the first active session.

14. The DSDS device of claim 11, wherein:

the first wireless network is a Citizens Broadband Radio Service (CBRS) network; and the second wireless network is a non-CBRS network.

15. A method comprising a dual-SIM, dual-subscription (DSDS) mobile transfer entity (DMTE):

receiving information that original operations of a first base station of a first wireless network are to be modified;

determining that a DSDS device has a first active session with the first base station;

generating instructions for the DSDS device to establish a second active session with a second base station of a second wireless network in order to hand off the first active session with the first wireless network to the second active session with the second wireless network, wherein the second active session is related to the first active session;

receiving information that the original operations of the first base station are to be restored;

determining that the DSDS device has the second active session with the second base station; and generating instructions for the DSDS device to establish a third active session with the first base station in order to hand off the second active session with the second wireless network to the third active session with the first wireless network, wherein the third active session is related to the second active session.

16. The method of claim 15, wherein:

the first wireless network is a Citizens Broadband Radio Service (CBRS) network; and the second wireless network is a non-CBRS network.

17. A dual-SIM, dual-subscription (DSDS) mobile transfer entity (DMTE) comprising:

a memory; and at least one processor, coupled to the memory and operative to:

receive information that original operations of a first base station of a first wireless network are to be modified;

determine that a DSDS device has a first active session with the first base station;

generate instructions for the DSDS device to establish a second active session with a second base station of a second wireless network in order to hand off the first active session with the first wireless network to the second active session with the second wireless network, wherein the second active session is related to the first active session;

receive information that the original operations of the first base station are to be restored;

determine that the DSDS device has the second active session with the second base station; and generate instructions for the DSDS device to establish a third active session with the first base station in order to hand off the second active session with the second wireless network to the third active session with the first wireless network, wherein the third active session is related to the second active session.

18. The DMTE of claim 17, wherein:

the first wireless network is a Citizens Broadband Radio Service (CBRS) network; and the second wireless network is a non-CBRS network.

* * * * *